United States Patent [19]

Martin

[11] Patent Number: 4,824,301

[45] Date of Patent: Apr. 25, 1989

[54] DEVICE FOR ADJUSTING THE WORKING POSITION OF A MACHINE FOR PRODUCING A CHAMFER

[75] Inventor: Alain Martin, Caluire, France

[73] Assignee: Framatome, Courbevoie, France

[21] Appl. No.: 186,996

[22] Filed: Apr. 27, 1988

[30] Foreign Application Priority Data

Apr. 27, 1987 [FR] France ................... 8705935

[51] Int. Cl.$^4$ .................................. B23C 1/20
[52] U.S. Cl. ......................... 409/179; 51/241.5; 82/113
[58] Field of Search ............... 409/179, 178, 199, 180, 409/191, 218, 229, 130; 82/4 C, 1 E, 4 R; 51/241.S, 241 B, 241 R

[56] References Cited

U.S. PATENT DOCUMENTS

| | | | |
|---|---|---|---|
| 2,437,829 | 3/1948 | Mason | 409/218 X |
| 2,921,505 | 1/1960 | Hoglund | 409/191 |
| 3,477,341 | 11/1969 | Rickenbrode | 409/130 |
| 3,550,488 | 12/1970 | Anderson | 82/4 |
| 3,687,007 | 8/1972 | Harris | 409/178 |
| 4,177,610 | 12/1979 | Farkas | 409/179 X |
| 4,297,061 | 10/1981 | Wolfe et al. | 409/179 |
| 4,361,061 | 11/1982 | Pullen | 409/179 |

FOREIGN PATENT DOCUMENTS

| | | |
|---|---|---|
| 837637 | 4/1952 | Fed. Rep. of Germany . |
| 2312786 | 9/1974 | Fed. Rep. of Germany . |
| 2049303 | 3/1971 | France . |
| 2544269 | 10/1984 | France . |
| 2593732 | 8/1987 | France . |
| 0000283 | 1/1979 | Japan ................... 409/179 |
| 129636 | 11/1984 | Japan . |
| 691064 | 5/1953 | United Kingdom ............ 51/241 S |

*Primary Examiner*—William Briggs
*Attorney, Agent, or Firm*—Pollock, Vande Sande & Priddy

[57] ABSTRACT

The adjustment device comprises three rings (15, 16, 17), whose inside diameter is greater than the outside diameter of the part of the hollow workpiece (5) on which the chamfer (10) is to be machined. The support ring (15) is fastened in a substantially centered position on the workpiece (5), and carries support assemblies (20) for the orientation ring (16). The assemblies (20) make it possible to adjust the position of the orientation ring (16) in the direction of the axis (8) of the workpiece (5) and its orientation in relation to the cross-sectional planes of the workpiece (5). The adjustment ring (17) is mounted for adjustment in position on the orientation ring (16) in the plane (11) of connection of the chamfer (10). The machine is adjusted with the aid of comparators (59, 60) whose sensors come into contact with reference surfaces (17a, 17b) of the adjustment ring (17).

7 Claims, 5 Drawing Sheets

FIG. 10
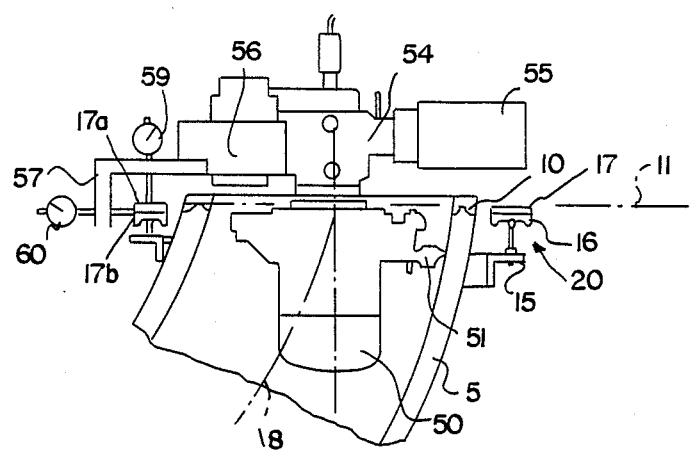
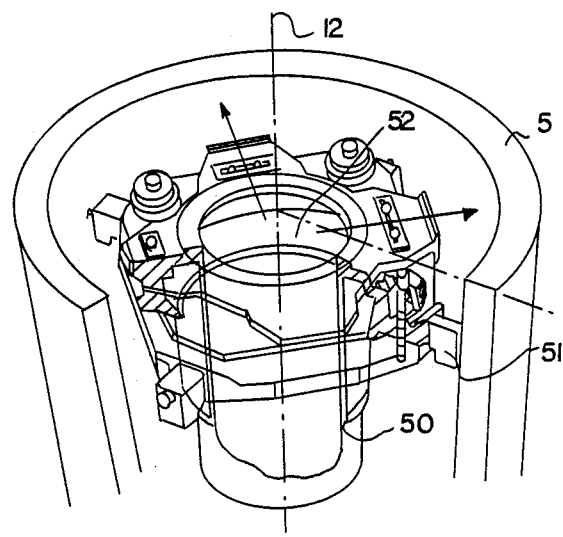
FIG. 9

DEVICE FOR ADJUSTING THE WORKING POSITION OF A MACHINE FOR PRODUCING A CHAMFER

FIELD OF THE INVENTION

The invention relates to a device for adjusting the working position and orientation of the axis of rotation of a machine producing a chamfer on a rotationally symmetrical part of a hollow workpiece.

Pressurized water nuclear reactors incorporate a vessel which contains the core of the reactor and is filled with pressurized water, together with a primary circuit consisting of a plurality of loops in communication with the vessel for the purpose of permitting the circulation of the pressurized water and its cooling outside the vessel. Each of the loops of the primary circuit incorporates a steam generator in which the pressurized water is cooled, thus heating and vaporizing the feed water. The steam generators of each of the loops are connected to the vessel by pressurized water inlet and outlet pipes, known as primary pipes.

After a certain period of operation, the steam generators, which contain a bank of heat exchange tubes effecting the separation between the primary water and the feed water, must be checked, and if certain tubes of the tube bank show leaks, these tubes must be sealed off by a stopper or jacketed in order to avoid contamination of the feed water.

When the steam generator has been in operation for a long time, it may be found necessary to replace all or some of the tubes of the tube bank.

This operation, however, is complex, so that at the present time the complete replacement of the steam generators of pressurized water nuclear reactors is favored.

This replacement operation makes it necessary to cut the primary pipes near the pipe connections of the used generator and to weld the pipe connections of the new steam generator to the primary pipes left disconnected. Before teh welding can be done for the connection between the pipe connections of the new generator and the primary circuit pipes, it is necessary, since all these parts are very thick, to machine chamfers of a special shape on the ends of the primary pipes, these chamfers matching for connection purposes the chamfers machined on the ends of the pipe connections of the new generator during its manufacture.

The cutting of the primary pipes, which is done before the disconnection of the used steam generator, is effected in such a manner that an end portion, which is rotationally symmetrical about the axis of the pipe, can be machined on each of the primary pipes to produce a chamfer whose position an orientation enable it to be placed in perfect coincidence with the corresponding chamfer on the pipe connection of the new steam generator.

The machining of a chamfer on the end of the primary pipes, which chamfer is so positioned and oriented as to permit perfect coincidence with the connection parts of the new steam generator, is an operation which is very difficult to achieve and which necessitates the use of means perfectly adapted to the characteristics of the new steam generator.

Support means for the steam generator which, with accurate knowledge of the characteristics of the new steam generator leaving the factory, make it possible to define the position and orientation of the connection components of the primary part of the steam generator, are placed in position in the reactor building.

The exact position of the connection surfaces of the chamfers on the primary pipe connections can be obtained with the aid of a template or jig reproducing the characteristics of the bottom of the steam generator on which the primary pipe connection are fixed. In particular, the position of the connection planes of the chamfers can be obtained with the aid of a component provided with marking means situated exactly in the connection plane when the jig is placed in position on the supports of the steam generator. It is then possible to mark on the outside surface of the primary pipe awaiting connection a line corresponding to the intersection of that pipe by the connection plane of the pipe connection. On the primary pipe this line represents the position of the end face of the chamfer which is to be machined.

For the purpose of machining a chamfer on a rotationally symmetrical portion of a hollow workpiece, such as a primary pipe, whose diameter is of the order of 700 millimeters, it is possible to use a machine which has a body provided with means for fastening it inside the hollow workpiece and on which is mounted a rotationally movable part carrying the chamfer machining tool. The position of the fixed body inside the hollow workpiece is adjustable and makes it possible to define the position of the axis of rotation of the movable machining part in relation to that part of the hollow workpiece which is to be machined.

The connection plane of the chamfer is generally inclined relative to the cross-sectional planes of the part of the workpiece which is to be machined, which are at right angles to the axis of revolution.

In addition, the position of the chamfer of the steam generator pipe connection may necessitate the offcentering of the primary pipe chamfer in relation to the part of the pipe which is to be machined. The machining axis and the axis of revolution of the workpiece are therefore generally not identical.

It is thus very difficult to adjust the working position of the chamfering machine.

SUMMARY OF THE INVENTION

The invention therefore seeks to provide a device for adjusting the working position and orientation of the axis of rotation of a machine producing a chamfer on a rotationally symmetrical part of a hollow workpiece, said machine comprising a body provided with adjustable fastening means defining the axis of rotation of the machine and comprising a part mounted for rotational movability about said axis on said body and carrying the chamfer machining tool, this adjustment device allowing the chamfering machine to be easily positioned and oriented whatever the position and inclination of the end plane of the chamfer and whatever the inclination of the machining axis in relation to the axis of revolution of the part to be machined.

To this end, the device according to the invention is composed of an assembly of annular shape whose inside diameter is greater than the outside diameter of the part of the workpiece to be machined, and which comprises:

a first ring, called the support ring, comprising means for fastening on the hollow workpiece around the part to be machined, and screw adjustmetn means coming to bear against the hollow workpiece for the adjustment of the position of the support ring in at least two directions at right angles to the axis of revolution of the part to be machined, as well as at least three adjustable support assemblies regularly distributed on the circumference of the support ring, a second ring, or orientation ring, carried by the support ring with the aid of support assemblies of adjustable length enabling the position of the orientation ring to be adjusted in the direction of the axis of revolution of the part to be machined and enabling its orientation to be adjusted in relation to the cross-sectional planes of the part to be machined which are perpendicular to the axis of revolution, and a third ring, or adjustment ring, carried by the orientation ring and provided with means for its displacement in at least two directions of the plane of the orientation ring, and with means for its fastening on the orientation ring, the adjustment ring additionally comprising, on at least a part of its plane face opposite the plane of the orientation ring and on at least a part of its side surface, two zones carefully machined to constitute two reference surfaces for the adjustment of the chamfer machine.

BRIEF DESCRIPTION OF THE DRAWINGS

In order that the invention may be made clearly understood, a description will now be given, by way of example and with reference to the accompanying drawings, of one embodiment of an adjustment device according to the invention and of its utilization for adjusting the position of a machine for producing a chamfer on a primary pipe of a pressurized water nuclear reactor.

FIG. 9 is a view in perspective of the body of the chamfering machine in position inside the primary pipe on which the chamfer is to be made.

FIG. 10 is a view in section of the chamfering machine during its adjustment with aid of the device according to the invention.

DESCRIPTION OF PREFERRED EMBODIMENT

Figure 1:
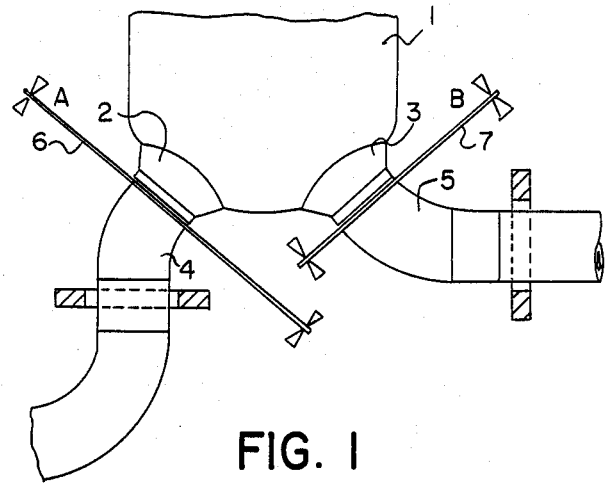
FIG. 1 is a schematic elevational view of the bottom part of a steam generator and of the primary pipes connected to the steam generator.

FIG. 1 shows the bottom of a steam generator 1 of a pressurized water nuclear reactor having two pipe connections 2 and 3 for the connection of the pipes 4 and 5 of the primary circuit of the reactor.

In order to change the steam generator, the primary pipes 4 and 5 are cut in the cutting planes 6 and 7.

The steam generator is then separated from the primary pipes, which remain in position in the reactor building.

Figure 2:
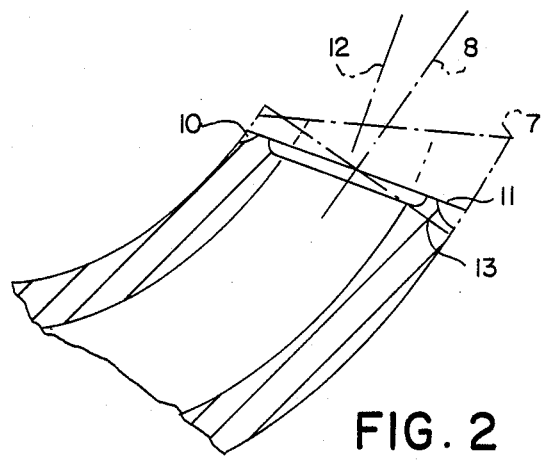
FIG. 2 is a sectional view of the end of a primary pipe in its part intended for connection to the steam generator.

FIG. 2 shows one of the disconnected primary pipes 5 after it has been cut in the cutting plane 7. The pipe 5 is curved in shape and its end near the cutting plane 7 constitutes a part which is substantially rotationally symmetrical about an axis 8 and in which it is required to machine a chamfer whose shape and position are represented by broken lines 10. The marking 11 of the connection plane corresponding to the end face of the chamfer is also shown in broken lines. This connection plane is formed by a continuous line marked on the outers surface of the pipe 5. This marking is obtained, as previously indicated, with the aid of a jig reproducing the bottom part of the steam generator and provided with marking means.

The plane 11 is set back in relation to the cutting plane 7 and forms a certain angle with the latter. The plane 11 is generally separate from the cross-sectional plane 13 of the pipe at right angles to the axis 8, in the end zone of the chamfer. Finally, the chamfer machining axis 12 at right angles to the plane 11 and constituting the axis of revolution of the chamfer 10 may be slightly offset relative to the pipe centre through which the axis 8 of the pipe passes. The exact position of the chamfer and of its axis of revolution 12 is determined by topometric measurements on the components positioning the new generator and with the aid of geometrical data and exact dimensions relating to the new generator leaving the factory.

The adjustment device according to the invention which will be described below makes it possible to adjust the working position of the machine producing the chamfer 10 in the pipe 5, and to orient the axis of rotation of its movable parts along the theoretical axis 12 of the chamfer, as determined by topometry.

Figure 3:
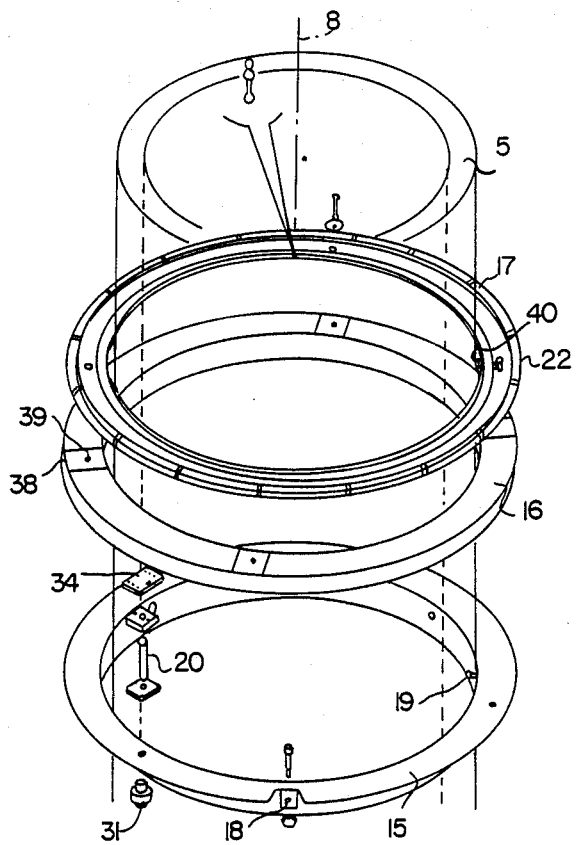
FIG. 3 is an exploded view in perspective of the adjustment device according to the invention.

FIG. 3 shows all the components of the device according to the invention in position around the pipe 5, before assembly. This arrangement comprises three superposed rings 15, 16 and 17 whose inside diameter is greater than the outside diameter of the pipe 5. The ring 15 situated at the bottom of the device in FIG. 3 is a support ring comprising three suspension members 18 disposed at 120° from one another on its periphery, and eight centering and fastening devices 19 disposed at 45° relative to one another, likewise on the periphery of the ring 15. The suspension members 18 and the devices 19 are placed in positions offset in relation to one another, as can be seen in FIG. 4.

Figure 4A:
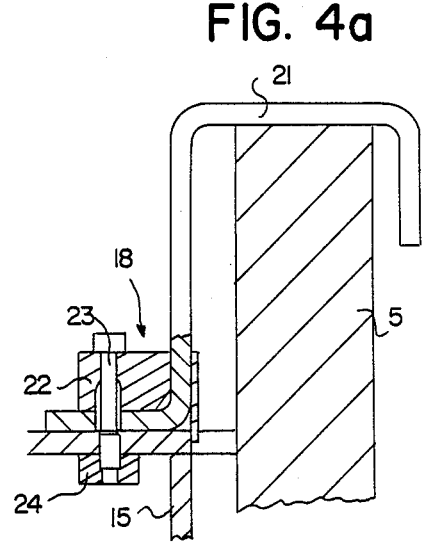
FIG. 4a is a view in section of a means for the temporary fastening of the support ring shown in FIG. 4.
Figure 4:
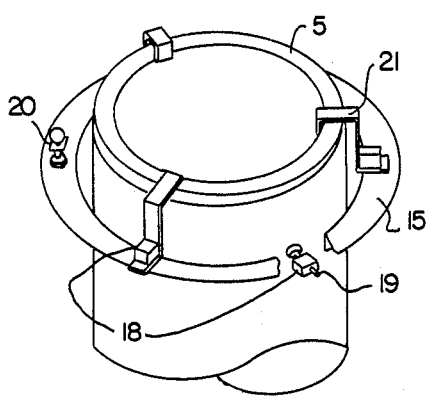
FIG. 4 is a view in perspective of the support ring of the adjustment device according to the invention during its installation on a primary pipe which is to be machined.
Figure 4B:
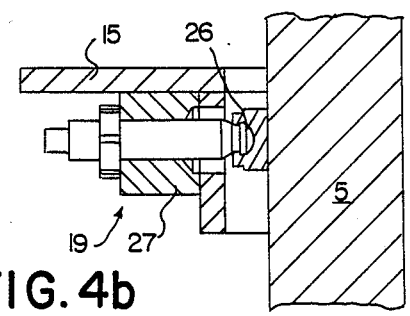
FIG. 4b is a view in section of a means for the fastening and centering of the support ring shown in FIG. 4.

These components are shown in detail in FIGS. 4a and 4b.

The ring 15 is also provided with three support members 20 situated in positions at 120° from one another on the circumference of the ring 15. These screw and ball joint arrangements 20 can be seen in greater detail in FIG. 5.

FIGS. 4, 4a and 4b show the components for suspending and fastening the support ring 15 on the pipe 5.

The suspension members 18 each comprise an angle 21, the U-shaped top part of which comes to rest on the end of the pipe 5 to effect the temporary suspension of the support ring 15, and a fastening foot 22 welded to the bottom part of the angle 21. The foot 22 and the angle are provided with through holes, which are brought into alignment with a corresponding opening in the ring 15 to permit the passage of a fastening screw 23 which cooperates with a nut 24 to fasten and suspend the ring 15. The nut 24 is fixed by welding on the bottom face of the ring 15, and the screw 23is held captive in the fastening foot 22.

In FIG. 4 the ring 15 is shown suspended in position on a vertically directed pipe 5. This provisional positioning of the ring 15 with the aid of the suspension assemblies 18 makes it possible to effect its definitive centering and fastening with the aid of the eight centering and fastening devices 19, of which one is shown in FIG. 4b. This fastening and centering means comprises a screw 25 fastened at its end to a shoe 26 which comes to bear, for the centering and fastening of the ring 15, against the outer wall of the pipe 5. Each of the screws 25 provided with shoes cooperates with a nut 27 fastened to the bottom of the ring 15 and placed with its tapped bore in the radial direction of the ring 15.

When the support ring 15 is centered and fastened with the aid of the three assemblies 19, the provisional suspension members 18 are removed to free the zone situated on the periphery of the pipe 5 above the ring 15.

Figure 8A:
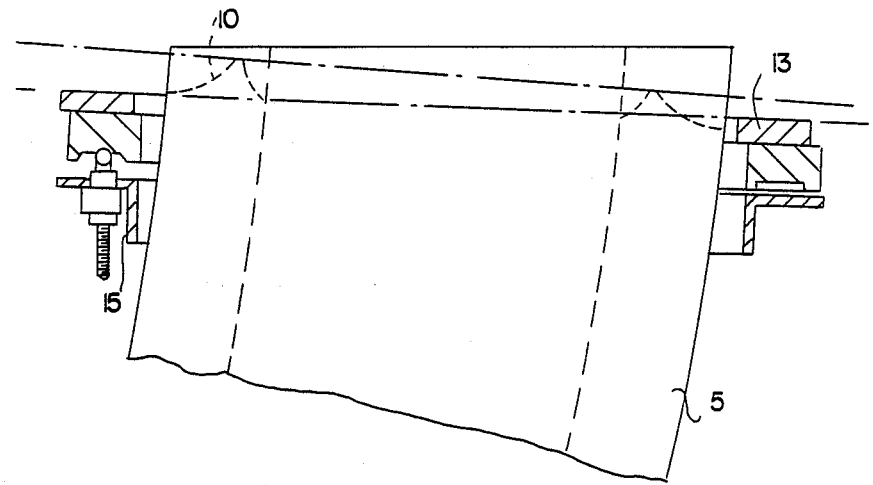
FIG. 8a is a schematic sectional half-view showing the adjustment device in its initial position.
Figure 8B:
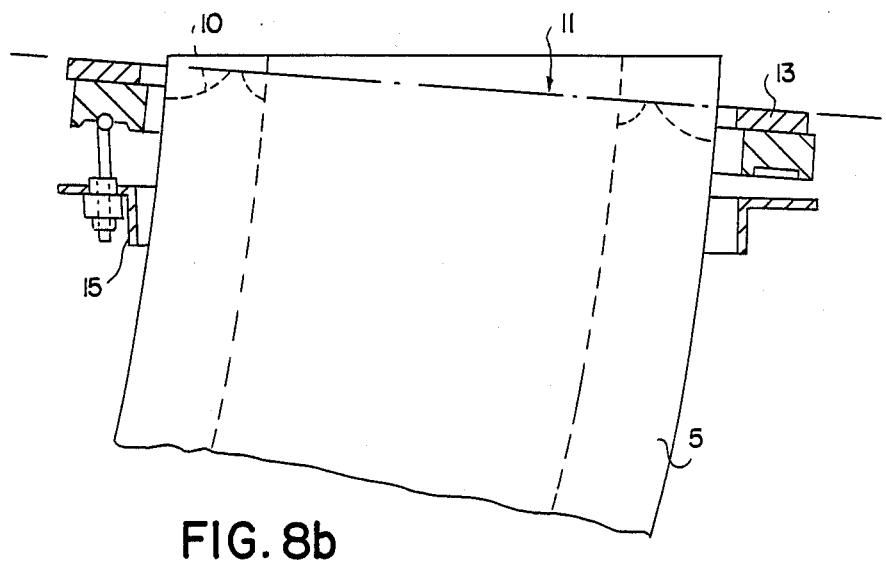
FIG. 8b is a half-view in section showing the regulation device in its final position permitting adjustment of the chamfering machine.

The ring 15 is placed in position slightly below the zone of the pipe 5 in which the chamfer 10 is to be machined, as can be seen in FIGS. 8a and 8b. The centering of the ring 15 relative to the pipe 5 is effected only approximately.

Figure 5:
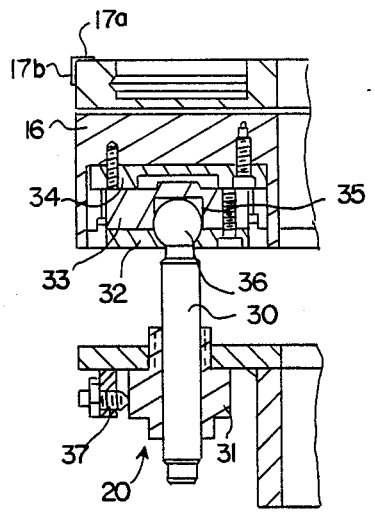
FIG. 5 is a half-view in section through a radiation plane, at the site of a support assembly, of the adjustment device shown in FIG. 3, after assembly of its component elements.

FIGS. 3 and 5 show the screw and ball joint support assemblies 20 which make it possible to support and adjust the position of the ring 16, or orientation ring, on the support ring 15.

The support assemblies 20 are provided with a screw 30 whose threaded portion is engaged in a nut 31 mounted for rotation in an aperture extending through the ring 15 in such a manner that the rotation of the nut 31 entails a displacement of the screw 30 in a direction perpendicular to the faces of the ring 15, i.e., in a direction substantially parallel to the axis 8 of the pipe 5. The screw 30 has a head 30a constituting a ball joint permitting the connection between the screw 30 and the bottom part of the orientation ring 16. The ring 16 has a profiled shape and is provided with a hollow portion directed towards the top face of the support ring 15, in relation to which those parts of the screws 30 which are provided with the balls 30a project. The ball joints 30a are received in a corresponding socket formed inside the hollow portion of the orientation ring 16 by an assembly of plates 32, 33 and 34. The plate 34 is fixed to the bottom of the hollow portion of the orientation ring 16. The plate 33 is fixed on the plate 34, and the head 30a of the screw 30 constituting the ball joint is engaged in an opening 35 in the plate 33. The plate 32, which has an opening 36 of hemispherical shape in its central portion, is engaged over the the portion of the screw 30 opposite the ball joint 30a and then fixed in position with the aid of screws on thew plate 33. The sockets 35 and 36 in the plates 33 and 32 constitute the socket of the ball joint 30a. The orientation ring 16 is thus supported by the screws 30 and articulated to each of the screws.

The three adjustable support assemblies 20 situated at 120° intervals on the support ring 15 make it possible to adjust the position and the orientation of the ring 16 on which the ring 17 rests. The latter, constituting the adjustment ring, rests on supports 38 machined on the top surface of the ring 16 and slightly projecting upwards beyond the top face of the ring 16.

As can be seen in FIGS. 8a and 8b, the displacement of the screws 30 and their adjustment make it possible to place the top plane of the adjustment ring 17 to coincide perfectly with the connection plane 11 of the chamfer 10.

When the top face of the adjustment ring 17 has been perfectly positioned through the adjustement of the three screws 30 disposed at 120° intervals around the support ring 15, this adjustment position of the screws 30 is locked by means of set screws, such as 37 shown in FIG. 5, which are directed radially and engaged in tapped holes provided in a part of the ring 15.

The top face 17a of the adjustment ring 17 constitutes by its outer part a reference surface machined to for a very high quality surface. Similarly, the side surface 17b of the adjustment ring 17 constitutes a reference surface machined to form a very high quality surface.

When the top reference plane 17a of the ring 17 has been made to coincide with the connection plane 11 of the chamfer, it is still necessary to position the ring 17 accurately defining the position of the machining axis 12 at right angles to the connection plane 11.

Figure 6:
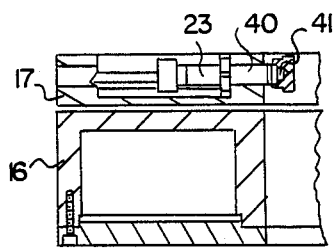
FIG. 6 is a half-view in section through a radial plane of the orientation ring and of the adjustment ring at the side of an adjustment ring positioning screw.
Figure 7:
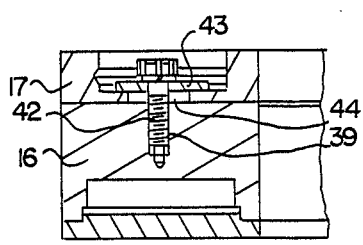
FIG. 7 is a half-view in section through a radial plane of the orientation ring and adjustment ring at the site of an adjustment ring fastening device.

For this purpose use is made of the adjustment, positioning and fastening means of the adjustment ring 17 which are shown in FIGS. 6 and 7.

In FIG. 6 can be seen a screw 40 for adjusting the position of the ring 17, this screw being engaged in a radially directed hole formed in said ring and provided with an end shoe 41 intended to come to bear against the outer surface of the pipe 5. Four adjustment screws 40 are disposed at 90° intervals on the circumference of the adjustment ring 17. Manipulation of these screws from the top of the ring 17 makes it possible to move the latter in two directions at 90° to one another in the plane 11. The position of the axis of the ring 17 at right angles to the connection plane 11 can thus be perfectly adjusted.

As will be explained hereinbelow, the adjustment of the chamfering machine enables the position of the machining axis 12 to be made to coincide perfectly with the axis of the adjustment ring 17. The axis of the adjustment ring 17 is defined as the axis of revolution of the cylindrical side surface 17b of said ring.

The positioning of the adjustment ring 17 in the plane 11 is defined by the topometric measurements which made it possible to define with very great accuracy the position of the chamfer machining axis 12.

FIG. 7 shows the means for fastening the adjustment ring 17 on the orientation ring when the position of said ring 17 has been adjusted.

The ring 17 is fastened on the ring 16 at each of the supports 38 machined on the top face of the orientation ring 16.

A tapped hole 39 is machined in the orientation ring 16, in each of the projecting parts 38 constituting the supports of the adjustment ring 17.

As can be seen in FIG. 7, the fastening means are in the from of screws 42 engaged in the tapped holes 39 provided in the orientation ring 16. Each of the screws 42 passes through the adjustment ring 17 by way of an opening 44 whose dimensions are larger than the diameter of the screw 42. The head of the screw 42 comes to bear against the ring 17 with the interposition of a washer 43 whose diameter is greater than the dimensions of the hol 44. The adjustment ring 17 can thus be fastened on the orientation ring 16 despite a certain radial offsetting of these two rings relative to each other, which is obtained during the adjustment of the position of the axis 17 with the aid of the screws 40.

FIG. 9 shows the body 50 of a chamfering machine in the working position inside a primary pipe 5 on which it is desired to form a chamfer in an accurately determined position. The body 50 of the chamfering machine has four adjustment and clamping shoes 51 disposed at 90° intervals around the body 50 of the chamfering machine.

The body 50 of the chamfering machine has a central bore 52 intended to receive the rotating part of the machine, carrying the chamfer machining tool.

When the position of the body 50 of the machine inside the pipe 5 has been adjusted, the shoes 51 are tightened to hold the body 50 in a fixed position in the pipe 5. The axis 12 of the bore 52 then corresponds to the chamfer machining axis.

In order to adjust the working position and the orientation of the axis of rotation of the welding machine, use is made of the adjustment device according to the invention, as illustrated in FIG. 10.

In FIG. 10 the adjustment device consisting of the rings 15, 16 and 17 is shown in the position which it occupies after its positioning and adjustment in the manner described above. In this position, the reference surface 17a of the adjustment ring coincides perfectly with the chamfer connection plane 11 and the cylindrical reference surface 17b has its axis coinciding with the axis of rotational symmetry of the chamfer 10 which is to be machined at the end of the pipe 5.

The adjustment device according to the invention enables the position of the body 50 of the chamfering machine in the pipe 5 to be adjusted in such a manner that the movable part 54 of the chamfering machine will itself be in a position permitting the machining of a chamfer 10 in the required position at the end of the pipe 5.

The movable part 54 of the chamfering machine is mounted for the rotation inside the bore 52 around the axis of the latter.

For the machining of the chamfer, this movable part is driven rotationally with the aid of a motor 55. The movable part 54 carries the machining head 56, on which is mounted the cutting tool permitting the machining of the chamfer 10. The head 56 comprises in particular a mechanism for tool infeed in the direction of the machining axis, for the purpose of producing the profile desired for the chamfer.

In FIG. 10, the chamfering machine is shown during its adjustment. An angle 57, on which two comparators 59 and 60 are fixed, is fastened on the machining head 56, during this adjustment phase, instead of the cutting tool. The sensor rod of the comparator 59 is placed in a direction substantially parallel to the axis of rotation of the chamfering machine, and the end of this rod comes into contact with the reference surface face 17a, which coincides perfectly with the connection plane 11 of the chamfer 10. Low-speed rotation of the movable part 54 of the chamfering machine permits adjustment of the position of the body 50 in the pipe 5 in order to achieve perfect parallelism of the machining plane and the plane 11. The amplitude of the infeed displacement of the tool for the purpose of forming the connection face of the chamfer can also be accurately determined.

The sensor rod of the comparator 60 is placed in a direction perpendicular to the axis of rotation of the chamfering machine, and its end comes into contact with the cylindrical reference surface 17b. By low-speed rotation of the movable part 54 of the chamfering machine it is thus possible to adjust the position of the machining axis 12 with the aid of the adjustment shoes 51 of the body 50 of the chamfering machine.

The working position and the orientation of the machining axis are then perfectly adjusted to permit the machining of a chamfer 10 in the required position at the end of the pipe 5.

The device according to the invention can be placed in position very quickly and very easily on the part which is to be machined, and this device permits rapid and very reliable adjustment of the working position of the chamfering machine.

The support assemblies for the orientation ring may have a shape different from that described. Similarly, the adjustment and fastening means for the support ring and for the adjustment ring may be different from those described.

The adjustment device according to the invention may be used not only for adjusting a machine for producing a chamfer on a primary pipe of a pressurized water nuclear reactor, but also for the adjustment of any machine for producing a chamfer on a rotationally symmetrical part of a hollow workpiece.

What is claimed is:

1. Device for adjusting the working position and orientation of the axis of rotation of a machine producing a chamfer (10) on a rotationally symmetrical part of a hollow workpiece (5), said machine comprising a body (50) provided with adjustable fastening means (51) defining the axis of rotation (12) of the machine, and comprising a part (54) mounted for rotational movability about the axis (12) on the body (50) and carrying the chamfer machining tool, composed of an assembly of annular shape whose inside diameter is greater than the outside diameter of the part of the workpiece to be machined, and which comprises:

(a) a first ring (15), called the support ring, comprising means (18, 19) for fastening on the hollow workpiece (5) around the part to be machined, and screw adjustment means (25) bearing against the hollow workpiece (5) for the adjustment of the position of the support ring (15) in at least two directions at right angles to the axis of revolution of the part to be machined, as well as at least three adjustable support assemblies (20) regularly distributed on the circumference of the support ring (15), (b) a second ring (16), or orientation ring, having a plane face and carried by the support ring (15) with the aid of support assemblies (20) of adjustable length enabling the position of the orientation ring (16) to be adjusted in the direction of the axis of revolution of the part to be machined and enabling its orientation to be adjusted in relation to the cross-sectional planes of the part to be machined which are perpendicular to the axis of revolution, and (c) a third ring (17), or adjustment ring, carried by the orientation ring (16) and provided with means (40) for its displacement in at least two directions of the plane of the orientation ring, and with means (42) for its fastening on the orientation ring (16), the adjustment ring (17) additionally comprising, on at least a part (17a) of its plane face opposite the plane of the orientation ring (16) and on at least a part (17b) of its side surface, zones machined to constitute two reference surfaces of the adjustment of the chamfering machine.

2. Adjustment device according to claim 1, wherein the support ring (15) comprises means (18) for suspension on the hollow workpiece (5) which are each composed of an angle (21) connected at one end to the support ring (15) and having at the other end a profiled portion intended to rest on an end portion of the hollow workpiece (5).

3. Adjustment device according to claim 1, wherein the screw adjustment means (19, 25) for positioning the support ring (15) comprise three screws (25), each engaged in a nut (27) fastened to the support ring (15) and having a radially directed tapped bore, the nuts (27) being disposed at 120° intervals on the circumference of the ring (15) and the screws (25) being fastened to a shoe (26) at their end coming to bear against the hollow workpiece (5).

4. Adjustment device according to claim 1, wherein the support assemblies (20) of the orientation ring (16) are each composed of a screw (30) having a spherical head (30a) and a nute (31) mounted for rotation about the axis of its bore on the support ring (15) and in engagement with the screw (30) in such a manner that through its rotation it displaces, in a direction at right angles to the plane of the ring (15) corresponding substantially to the direction of the axis of revolution of the part to be machined, the head (30a) of the screw mounted pivotally in an articulation bearing (32, 33) fastened to the orientation ring (16).

5. Adjustment device according to claim 4, wherein each of the support assemblies (20) comprises a set screw (37) for locking the nut (31) of the screw (30) in respect of rotation.

6. Adjustment device according to claim 1, wherein the means (40) for the displacement of the adjustment ring (17) consist of screws (40) each of which is engaged in a radially directed tapped hole in the ring (17), each screw having a shoe (41) at its end directed toward the interior of the adjustment ring (17) to bring the screw to bear against the hollow workpiece (5).

7. Adjustment device according to claim 1, wherein the means for fastening the adjustment ring (17) on the orientation ring (16) consist of screws (42) passing through the adjustment ring in an axial direction by way of holes (44) whose dimensions are greater than the diameter of the screw (42), which has a head bearing against the adjustment ring (17) around the hole (44) with the interposition of a washer (43), the orientation ring (16) having tapped holes (39) cooperating with the screws (42) for the purpose of fastening the adjustment ring (17).

* * * * *